(12) United States Patent
Erven

(10) Patent No.: US 11,527,366 B2
(45) Date of Patent: Dec. 13, 2022

(54) CURRENT PATH PART FOR AN ELECTRIC SWITCHING DEVICE

(71) Applicant: Siemens Aktiengesellschaft, Munich (DE)

(72) Inventor: Wolfgang Erven, Amberg (DE)

(73) Assignee: Siemens Aktiengesellschaft, Munich (DE)

( * ) Notice: Subject to any disclaimer, the term of this patent is extended or adjusted under 35 U.S.C. 154(b) by 123 days.

(21) Appl. No.: 16/968,947

(22) PCT Filed: Feb. 1, 2019

(86) PCT No.: PCT/EP2019/052477
§ 371 (c)(1),
(2) Date: Aug. 11, 2020

(87) PCT Pub. No.: WO2019/158374
PCT Pub. Date: Aug. 22, 2019

(65) Prior Publication Data
US 2020/0402731 A1    Dec. 24, 2020

(30) Foreign Application Priority Data
Feb. 13, 2018 (DE) ............. 10 2018 202 187.2

(51) Int. Cl.
*H01H 1/021* (2006.01)
*H01H 1/58* (2006.01)
(Continued)

(52) U.S. Cl.
CPC ............ *H01H 1/021* (2013.01); *B33Y 10/00* (2014.12); *B33Y 80/00* (2014.12); *H01H 1/58* (2013.01);
(Continued)

(58) Field of Classification Search
CPC ........ H01H 1/021; H01H 1/58; H01H 1/0206; H01H 11/04; H01H 11/048; B33Y 10/00;
(Continued)

(56) References Cited

U.S. PATENT DOCUMENTS 7,564,330 B2 * 7/2009 Pickhard .............. H01H 1/0201
335/196
9,318,277 B2 * 4/2016 Malacara-Carrillo ......................
H01H 1/023
(Continued)

FOREIGN PATENT DOCUMENTS

DE          10019121 A1   10/2001
DE      102007012442 A1    2/2008
(Continued)

OTHER PUBLICATIONS

Translation or DE102014209762 (Original document published Nov. 26, 2015) (Year: 2015).*
PCT International Search Report and Written Opinion of International Searching Authority dated May 10, 2019 corresponding to PCT International Application No. PCT/EP2019/052477 filed Feb. 1, 2019.

*Primary Examiner* — William A Bolton
(74) *Attorney, Agent, or Firm* — Harness, Dickey & Pierce, P.LC

(57) ABSTRACT

A part of a current path is for an electric switching device. In an embodiment, the part of the current path was produced in layers by way of a 3D printing method.

19 Claims, 4 Drawing Sheets

(51) Int. Cl.
*H01H 11/04* (2006.01)
*B22F 10/20* (2021.01)
*B33Y 10/00* (2015.01)
*B33Y 80/00* (2015.01)

(52) U.S. Cl.
CPC ............. *H01H 11/04* (2013.01); *B22F 10/20* (2021.01); *B22F 2301/10* (2013.01); *B22F 2301/35* (2013.01)

(58) Field of Classification Search
CPC .. B33Y 80/00; B22F 2301/10; B22F 2301/35; B22F 10/20
USPC ................................ 200/238, 267, 268, 269
See application file for complete search history.

(56) References Cited

U.S. PATENT DOCUMENTS

| | | | | |
|---|---|---|---|---|
| 9,469,773 | B2 * | 10/2016 | Walker | C23C 18/42 |
| 9,754,735 | B2 * | 9/2017 | Eismann | H01H 1/023 |
| 2015/0048054 | A1 * | 2/2015 | Karkada | H01H 11/048 29/875 |
| 2016/0300669 | A1 * | 10/2016 | Lettow | H01H 1/029 |
| 2017/0100916 | A1 * | 4/2017 | Bharadwaj | B32B 15/04 |

FOREIGN PATENT DOCUMENTS

| | | |
|---|---|---|
| DE | 102014209762 A1 | 11/2015 |
| DE | 102015216749 A1 | 3/2017 |
| EP | 2838096 A1 | 2/2015 |
| EP | 3109879 A1 | 12/2016 |

\* cited by examiner

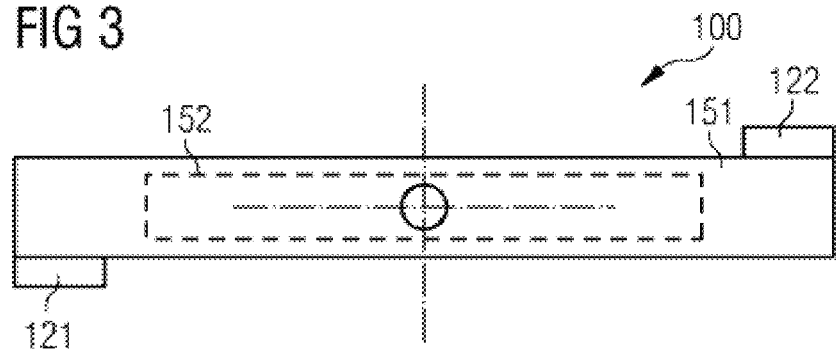
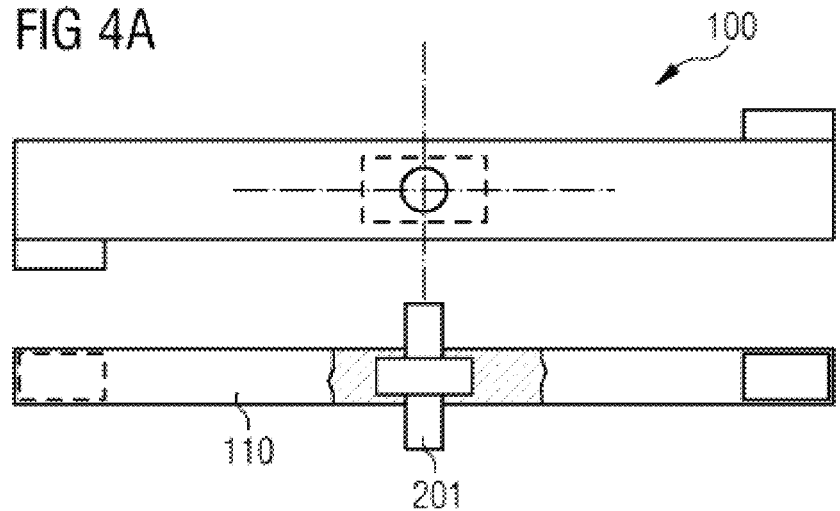
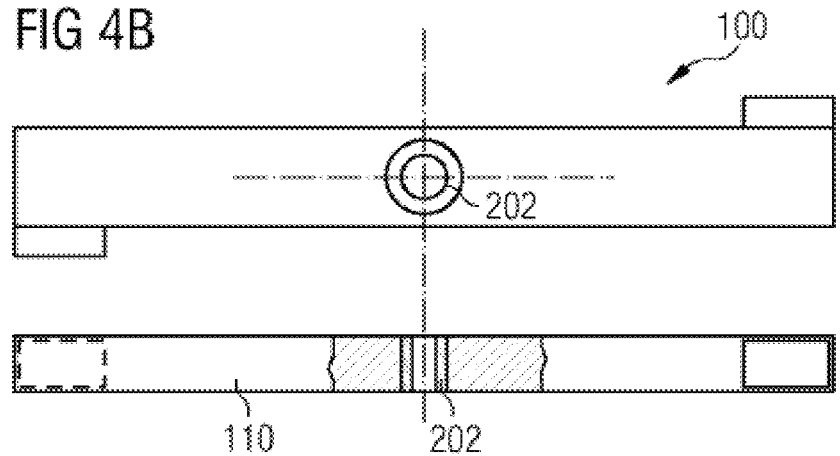

CURRENT PATH PART FOR AN ELECTRIC SWITCHING DEVICE

PRIORITY STATEMENT

This application is the national phase under 35 U.S.C. § 371 of PCT International Application No. PCT/EP2019/052477 which has an International filing date of Feb. 1, 2019, which designated the United States of America and which claims priority to German Application No. DE 102018202187.2 filed Feb. 13, 2018, the entire contents of each of which are hereby incorporated by reference herein, in their entirety and for all purposes.

FIELD

Embodiments of the present invention generally relate to a current path part for an electrical switching device.

BACKGROUND

Current path parts in switchgear are normally of compact design. Typically, current path parts will have a maximum density on the basis of the primarily used methods of manufacture, such as punching, extrusion or casting. The design of conventional current path parts is oriented to the constraints of these methods of manufacture, for example the methods punching or extrusion that are used allow only two-dimensionally (2D) shaped current path parts to be produced. A further dimension can be achieved only by subsequent steps such as for example bending or mechanical refinishing. To date, tight limits have been set for the design according to demands of the electrical and thermal function of a current path part, the material saving or the stiffness-conforming design.

By way of example, the whole current lead is not needed as an electrical or thermal conductor, since current conduction physically takes place at the surface. Manufacturing a current path part that only carries the current at the surface has not been possible to date. The conventional methods of manufacture therefore currently do not allow for example hollow geometries or the creation of apertures or freeform surfaces in the direction of manufacture, for example the direction of punching, from a technological point of view. Similarly, functional separation into different materials on one component cannot be achieved conventionally. The conductor material restricts further integration of functions, since other types of materials or components can be assembled only by way of joining methods.

DE 100 19 121 A1 discloses an electrical switching contact having a contact carrier made from a first material and at least one contact piece made from a second material having a sinter structure, the first material likewise having a sinter structure, which merges fluently into the sinter structure of the second material.

DE 10 2007 012 442 A1 describes an electrical switching device that contains at least one nonmagnetic first component and at least one magnetic second component. The second component is made from a plastic filled with a soft magnetic pulverulent material.

EP 3 109 879 A1 discloses a fixed contact for an electrical protective device made from a magnetic material, wherein a magnet element is accommodated in the fixed contact.

SUMMARY

At least one embodiment of the invention provides a current path component for an electrical switching device that overcomes the disadvantages known in the prior art.

At least one embodiment of the invention is directed to a current path part for an electrical switch. Advantageous refinements of the current path part according to the invention are specified in the claims.

At least one embodiment of the invention is directed to a current path part for an electrical switching device, produced layer by layer by way of a 3D printing method.

BRIEF DESCRIPTION OF THE DRAWINGS

The properties, features and advantages of this invention that are described above and the manner in which they are achieved will become clearer and more distinctly comprehensible in connection with the description of the example embodiments that follows, the example embodiments being explained in more detail in connection with the figures, in which:

FIG. 3 shows a current path part made from two different materials;

FIGS. 4A and 4B show a current path part with an integrated prefabricated component;

DETAILED DESCRIPTION OF EXAMPLE EMBODIMENTS

The production of the current path part according to at least one embodiment of the invention by way of a three-dimensional (3D) printing method allows the current path part to be designed such that the most favorable design for the function and the use of materials is chosen and it is no longer necessary to make allowance for the previous methods of manufacture. The function can be integrated in the geometry to a greater extent and allows freedoms that are not possible with the previous methods of manufacture.

In one refinement, the current path part according to at least one embodiment of the invention is produced from at least two different materials. The use of different materials allows the integration of functions of the current path part to be taken to the point at which ultimately the current path part has properties that were not possible previously, such as for example a different conductivity in one component.

In another refinement of the current path part, at least one embodiment comprises at least two different materials, the materials differ in terms of mechanical strength, electrical conductivity or magnetic properties.

In another refinement of at least one embodiment, the current path part is provided with at least one cavity. An advantage of this is that the introduction of cavities or hollow spaces means that the requirements of the function, for example electrical, thermal or mechanical, are met such that the hollow spaces are oriented and dimensioned accordingly. It is also possible to use design optimization to construct the current path component according to at least one embodiment of the invention in a manner oriented to function and cost without allowance for constraints of methods of manufacture.

In another refinement, the cross section of the current path part according to at least one embodiment of the invention is variable.

In another refinement of at least one embodiment, a prefabricated component was integrated on or in the current path part during the layer-by-layer production. This prefabricated component can be an axle or a bearing bush, for example.

In one refinement of at least one embodiment, the current path part was produced from a material that has different physical properties. For example, these different physical properties can be the conductivity.

In another refinement of at least one embodiment, the current path part according to the invention is a contact lever, a fixed contact or a busbar. The contact lever may be provided with at least one integrated contact surface.

Figure 1:
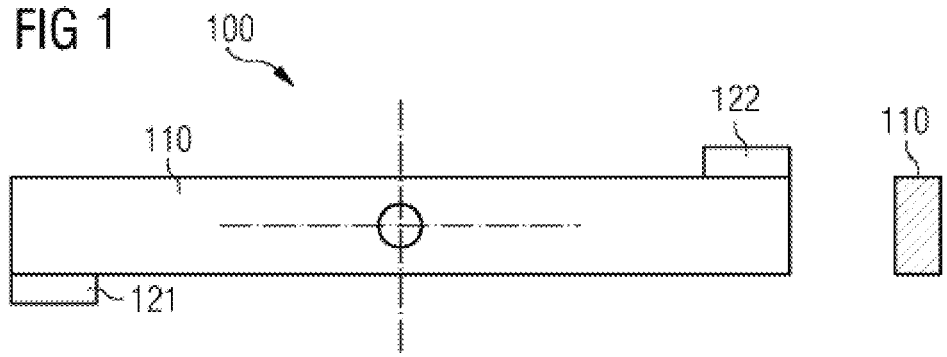
FIG. 1 shows a conventional current path part as a contact lever.

FIG. 1 depicts a conventional current path part 100. This current path part 100 is a contact lever, also called a double breaker. The contact lever 100 comprises two contact plates or contact surfaces 121; 122, which are mounted on the contact lever base body 110. The contact plates 121; 122 can interact with stationary contacts (also called fixed contacts) to open or close a circuit. The contact lever base body 110 is rectangular in cross section, as shown on the right in the depiction in FIG. 1.

Figure 2A:
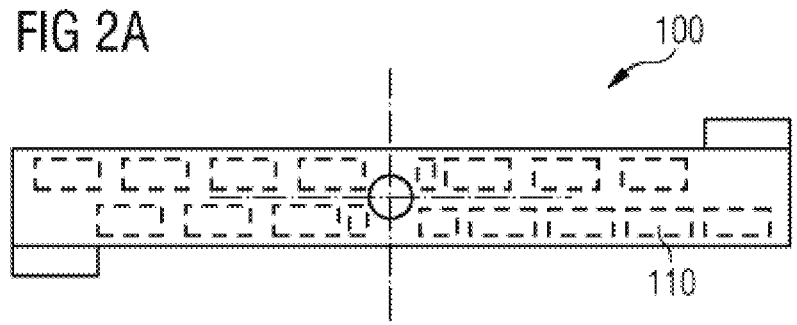
FIGS. 2A, 2B, 2C show a current path part with cavities and a variable cross section.

FIG. 2A depicts a current path part 100 according to an embodiment of the invention, likewise as a contact lever. The contact lever 100 again comprises a contact lever base body 110, which was produced layer by layer by way of a 3D printing method.

Figure 2B:
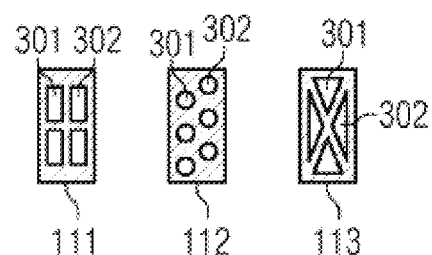

During the production of the current path part 100 and the layer-by-layer construction thereof, cavities 301; 302; 303 were introduced in the current path part base body 110. These cavities are depicted in FIG. 2B and can comprise a wide variety of geometric shapes. In accordance with the cross section 111 of the current path part 100, the cavities 301; 302 in the sectional depiction may be rectangular, i.e. by and large parallelepipedal, in form. Similarly, the cavities 301; 302 may be bubble-shaped in accordance with the depicted cross section 112 of the current path part base body 110. More complicated support structures within the current path part base body 110, as depicted on the right in FIG. 2B in the cross section 113, can also be produced by way of layer-by-layer production by way of a 3D printing method.

Figure 2C:
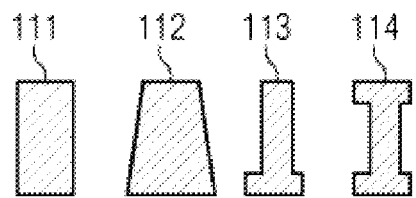

FIG. 2C depicts an alternative embodiment of the current path part 100 according to the invention, likewise using the example of a contact lever. The cross section of the contact lever base body 110 may be variable in form as well, for example as a rectangular shape in the case of the cross section 111, in a trapezoidal shape in the case of the cross section 112 or as a T-support in the case of the cross section 113 or as a double-T-support in the case of the cross section 114.

The variable cross section can change along the current path part base body 110. The current path part base body 110 can have any shape and distribution of the materials; the contact lever 100 can also have different cross sections according to its length, or the thickness can vary.

FIG. 3 depicts another example embodiment of a current path part 100 according to an embodiment of the invention in the form of a contact lever. The contact lever 100 in this case is produced from two different materials that differ in terms of their mechanical strength. For example, the material 151 in the region of the contact plates or contact surfaces can be for example a typical conductor material such as copper. The zone 152 may be produced from a reinforcement material such as for example a high-strength material such as steel. During the layer-by-layer construction by way of a 3D printing method, applicable contact levers 100 can be produced from different materials.

The two different materials can also differ in terms of electrical conductivity or in terms of magnetic properties. By way of example, the zone 151 may be made from a material having high electrical conductivity such as copper and the core material in the zone 152 may consist of a material having low electrical conductivity. Similarly, the two different materials can differ in terms of their magnetic properties.

FIGS. 4A and 4B depict a current path part 100 according to an embodiment of the invention in the form of a contact lever. A prefabricated component 201; 202 has been integrated in the respective contact lever 100 during the layer-by-layer production.

In accordance with the depiction in FIG. 4A, for example the prefabricated component 201 can be an axle around which the contact lever 100 is constructed layer by layer. In accordance with the depiction in FIG. 4B, the prefabricated component 202 may also be a bush around which the contact lever 100 was constructed during the layer-by-layer production.

Figure 5A:
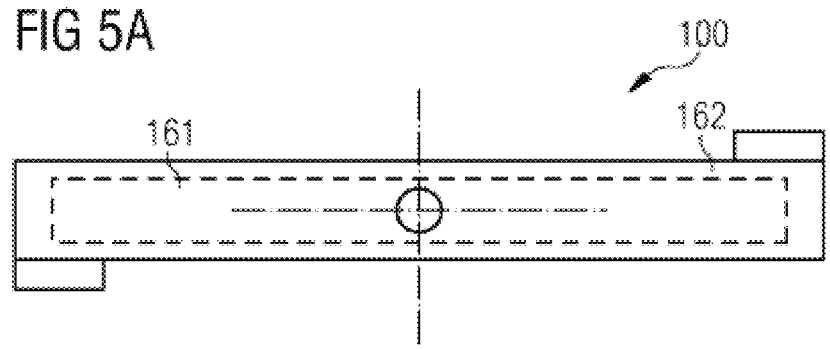
FIGS. 5A and 5B show a current path part made from a material with different physical properties.
Figure 5B:
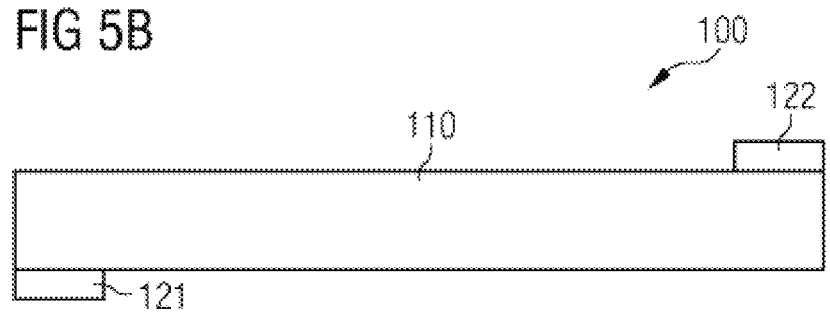

FIGS. 5A and 5B again show a current path part 100 according to an embodiment of the invention, this current path part 100 likewise being in the form of a contact lever. The contact lever 100 was produced from a single material, different zones of the material having different physical properties. For example, the contact lever 100 in FIG. 5A is produced using an outer material layer 162 that is produced from a copper material having high conductivity, and from a zone 161 with a core material that contains a copper having low conductivity, for example. The different physical properties of the material can therefore be the conductivity thereof, for example.

FIG. 5B again depicts a current path part 100 as a contact lever 100 with a contact lever base body 110 and contact plates or contact surfaces 121; 122. The contact plates or contact surfaces 121; 122 have been produced in a manner integrated on the contact lever 100 during the layer-by-layer production by way of a 3D printing method.

Figure 6:
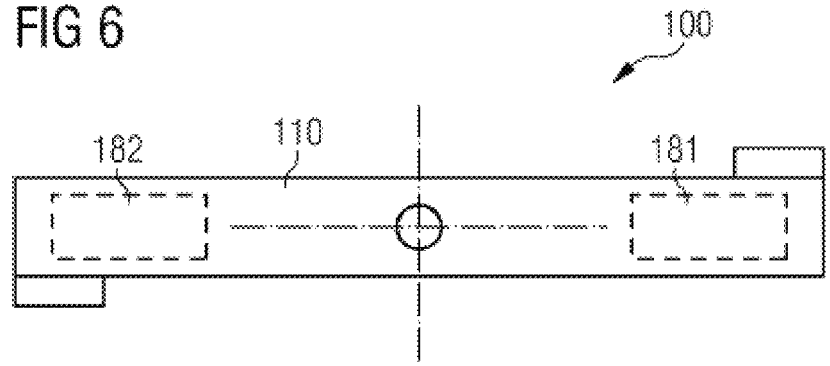
FIG. 6 shows a current path part made from two different materials with different magnetic properties.

FIG. 6 again shows a current path part 100 as a contact lever, which is produced from two different materials that differ in terms of magnetic properties, however. By way of example, the material of the current path part base body 110 can be a conductor material such as for example copper; the ends of the contact lever 100 can have two zones 181; 182 arranged on them, the material of which consists of magnetic iron. This modular construction allows arc influencing to be brought about; similarly, the opening and closing forces can be influenced together with the current loop and outer steel parts.

Figure 7A:
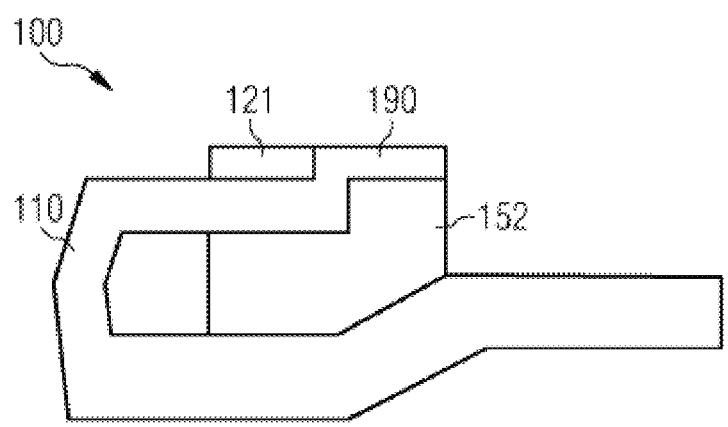
FIGS. 7A and 7B show a current path part with an arc runner and a steel under and a current path part with cavities.

FIG. 7A depicts a current path part 100 as a fixed contact. The fixed contact 100 has a contact plate 121 mounted on it. Arranged directly beside the contact plate 121 is what is known as an arc runner 190, which, when an arc is struck, affords the latter increased resistance with respect to the contact plate 121 under thermal load. Typically, the arc runner 190 should therefore be manufactured from a high-strength material such as for example steel and should be manufactured in a manner integrated on the fixed contact 100 during the layer-by-layer construction during the 3D printing. The fixed contact 100 furthermore comprises what is known as a steel under 152 for influencing the arc.

Figure 7B:
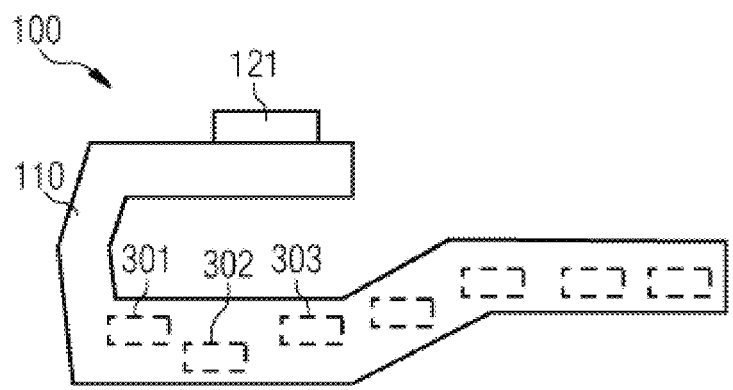

FIG. 7B depicts a current path part 100 according to an embodiment of the invention as a fixed contact with a subsequent busbar. The busbar contains cavities 301; 302;

303, which were produced during the layer-by-layer construction of the 3D printing method.

Similarly, the core material of the contact lever base body 110 may be manufactured from a conductor material such as for example copper, and the outer zones 181; 182 may be manufactured from a permanent magnet material for influencing arcs.

The current path parts 100 according to an embodiment of the invention can have cavities 301; 302; 303, also called hollow spaces, depending on the function. This allows a reduction of material and hence also a cost saving. Similarly, the current path part 100 according to an embodiment of the invention can have reinforcement elements made from high-strength materials such as for example steels. This makes it possible to produce a separation of functions between electric current conduction and mechanical strength.

Similarly, it is possible to produce current path parts 100 according to an embodiment of the invention in which insulating elements are integrated in order to stop the formation of parasitic voltages on other phases. Prefabricated components can be integrated in the current path parts 100 according to the invention, such as for example bearing bushes, supporting disks or attachments such as contact spring holders. This reduces the complexity of assembly.

The current path parts 100 according to an embodiment of the invention can have regions with different conductivities. The current is typically carried at the surface, which allows a reduction in the cost of materials. There is also the possibility of specific thermal balancing of the current path parts 100 with different thermal conductivities.

The current path parts 100 according to an embodiment of the invention can have contact facings or integrated contact surfaces 121; 122, for example, without these needing to be put on by way of a joining method. The advantage of this integral production is ready-to-install components without joining processes.

The current path parts 100 according to an embodiment of the invention can also contain integrated magnetic parts such as iron parts, which permit the arc to be influenced or can alter the opening and closing electrodynamic forces. Similarly, it is possible to integrate permanently magnetic regions that are likewise used for influencing arcs. A combination of the features presented here is likewise possible.

The manufacturing opportunities of the 3D printing method were applied to specific current path parts 100, which allows designs to be produced that are favorable for the function and the use of materials and no longer have to make allowance for the previous methods of manufacture. The function can be integrated in the geometry to a greater extent and allows freedoms that were not possible with the previous methods of manufacture.

In particular, it is possible for cavities 301; 302; 303 or else hollow spaces to be introduced that are oriented and dimensioned according to the requirements of the function, for example electrical, thermal or mechanical. It is also possible to use design optimization—for example to use simulation—to construct the components in a manner oriented to function and cost without making allowance for constraints of methods of manufacture.

Moreover, the 3D printing method provides the opportunity to specifically use different materials in one component, such as for example copper or iron materials, and thus to take the integration of functions further. The current path components 100 according to an embodiment of the invention therefore have properties that it was not possible to produce previously, such as for example different conductivities in one component.

The invention claimed is:

1. A current path part for an electrical switching device, the current path part comprising:
   a layer-by-layer portion produced by a 3D printing method; and
   at least one cavity having a cross section having a circular shape or a triangular shape.

2. The current path part of claim 1, wherein the layer-by-layer portion includes at least two different materials.

3. The current path part of claim 2, wherein the at least two different materials differ in terms of at least one of mechanical strength, electrical conductivity, or magnetic properties.

4. The current path part of claim 3, wherein a cross section of the current path part is at least one of a rectangular shape, a trapezoid shape, a T-support shape, or a double T-support shape.

5. The current path part of claim 2, wherein a cross section of the current path part is at least one of a rectangular shape, a trapezoid shape, a T-support shape, or a double T-support shape.

6. The current path part of claim 2, further comprising a prefabricated component portion integrated on or in the layer-by-layer portion.

7. The current path part of claim 6, wherein the prefabricated component portion includes an axle or a bearing bush.

8. The current path part of claim 2, wherein the current path part includes a material including a plurality of zones, the plurality of zones having different physical properties from each other.

9. The current path part of claim 2, wherein the current path part is a contact lever, a fixed contact or a busbar.

10. The current path part of claim 9, wherein the current path part is the contact lever and includes at least one integrated contact surface.

11. The current path part of claim 1, wherein a cross section of the current path part is at least one of a rectangular shape, a trapezoid shape, a T-support shape, or a double T-support shape.

12. The current path part of claim 1, further comprising a prefabricated component portion integrated on or in the layer-by-layer portion.

13. The current path part of claim 12, wherein the prefabricated component portion includes an axle or a bearing bush.

14. The current path part of claim 1, wherein the current path part includes a material including a plurality of zones, the plurality of zones having different physical properties from each other.

15. The current path part of claim 14, wherein the difference in the physical properties of the plurality of zones include differing conductivity.

16. The current path part of claim 1, wherein the current path part is a contact lever, a fixed contact or a busbar.

17. The current path part of claim 16, wherein the current path part is the contact lever and includes at least one integrated contact surface.

18. The current path part of claim 1, wherein a shape of a cross section of the current path part changes along a length of the current path part.

19. A current path part for an electrical switching device, the current path part comprising:
   a layer-by-layer portion produced by a 3D printing method; and a prefabricated component portion integrated on or in the layer-by-layer portion, the prefabricated portion including at least one of an axle or a bearing bush.

\* \* \* \* \*